(12) United States Patent
Williamson et al.

(10) Patent No.: US 8,314,817 B2
(45) Date of Patent: *Nov. 20, 2012

(54) MANIPULATION OF GRAPHICAL OBJECTS

(75) Inventors: John Williamson, Glasgow (GB);
Lorna M. Brown, Cambridge (GB);
James W. Scott, Cambridge (GB);
Stephen E. Hodges, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/276,972

(22) Filed: Oct. 19, 2011

(65) Prior Publication Data
US 2012/0032982 A1 Feb. 9, 2012

Related U.S. Application Data

(63) Continuation of application No. 11/771,151, filed on Jun. 29, 2007, now Pat. No. 8,068,121.

(51) Int. Cl.
*G09G 5/00* (2006.01)
(52) U.S. Cl. ........ 345/659; 345/649; 345/651; 345/619; 715/864; 715/866
(58) Field of Classification Search .................. 345/619, 345/649, 651, 652, 657, 659; 715/84, 866; 348/333.11, 333.12
See application file for complete search history.

(56) References Cited

U.S. PATENT DOCUMENTS

| | | | |
|---|---|---|---|
| 6,115,025 A | 9/2000 | Buxton et al. | |
| 6,366,856 B1 | 4/2002 | Johnson | |
| 6,441,828 B1 | 8/2002 | Oba et al. | |
| 7,054,552 B2 | 5/2006 | Konttinen | |
| 7,177,960 B2 | 2/2007 | Takizawa et al. | |
| 7,471,328 B2 | 12/2008 | Kim et al. | |
| 7,742,783 B2 | 6/2010 | Duarte | |
| 2002/0101418 A1* | 8/2002 | Vernier et al. | 345/418 |
| 2003/0048280 A1 | 3/2003 | Russell | |
| 2004/0141085 A1 | 7/2004 | Nickel et al. | |
| 2004/0201595 A1 | 10/2004 | Manchester | |
| 2005/0212757 A1 | 9/2005 | Marvit et al. | |
| 2006/0284874 A1 | 12/2006 | Wilson | |
| 2007/0046697 A1 | 3/2007 | Hussain | |
| 2008/0043032 A1 | 2/2008 | Mamona et al. | |
| 2008/0266326 A1 | 10/2008 | Porwal | |
| 2010/0045705 A1* | 2/2010 | Vertegaal et al. | 345/156 |
| 2011/0090256 A1* | 4/2011 | Manchester | 345/649 |

OTHER PUBLICATIONS

Kim et al., "Interaction with Hand Gesture for a Back-ProjectionWall," retrieved at <<http://www.cgv.tugraz.at/CGV/DigitalLibrary/publications/TechnicalReports/bs/TR-tubs-cg-2003-11.pdf>>, Computer Graphics, TU Braunschweig, 2003, pp. 12.

Rohs et al., "A Conceptual Framework for Camera Phone-based Interaction Techniques," available at least as early as May 22, 2007, at <<http://www.m-lab.ch/pubs/Conceptual_CP.pdf>>, pp. 19.

Rohs, "MarkerBased Interaction Techniques for CameraPhones," available at least as early as May 22, 2007, at <<http://w5.cs.uni-sb.de/~butz/events/mu3i-05/submissions/p01-Rohs.pdf>>, pp. 2.

* cited by examiner

*Primary Examiner* — Chante Harrison
(74) *Attorney, Agent, or Firm* — Lee & Hayes, PLLC

(57) ABSTRACT

Methods of manipulating graphical objects are described. One or more graphical objects are displayed in a fixed orientation with reference to a sensed reference direction. Manipulation is achieved by fixing the orientation or position of a displayed graphical object with reference to an apparatus, such as the display itself or a proxy device, detecting a change in orientation of that apparatus and editing the orientation of the graphical object based on the detected change.

20 Claims, 14 Drawing Sheets

MANIPULATION OF GRAPHICAL OBJECTS

RELATED APPLICATION

This application is a continuation of and claims priority to U.S. patent application Ser. No. 11/771,151, filed on Jun. 29, 2007, the disclosure of which is incorporated by reference herein.

BACKGROUND

With the large increase in the number of digital cameras, compared to film cameras, many people have large archives of digital images through which they want to browse. When viewing such images, for example on a computer screen or television, the user may discover that one or more of the images are in an incorrect orientation (e.g. where a camera has been used to take a photograph in portrait rather than landscape). Current user interfaces for rotating these images are limited and often provide only the ability to rotate an image through 90°. This may necessitate multiple rotation operations (e.g. where an image is upside down or where rotation is in a single direction). Freehand rotation is enabled in some user interfaces through dragging of a rotation marker using a mouse or stylus, however this can be difficult to operate. Where the images are viewed on a small device, such as a mobile telephone, PDA or handheld computer, such rotation operations may be further restricted and/or additionally difficult to use.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Methods of manipulating graphical objects are described. One or more objects are displayed in a fixed orientation with reference to a sensed reference direction. Manipulation is achieved by fixing the orientation or position of a displayed graphical object with reference to an apparatus, such as the display itself or a proxy device, detecting a change in orientation of that apparatus and editing the orientation of the graphical object based on the detected change. In an embodiment the graphical object is a still or a moving image.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
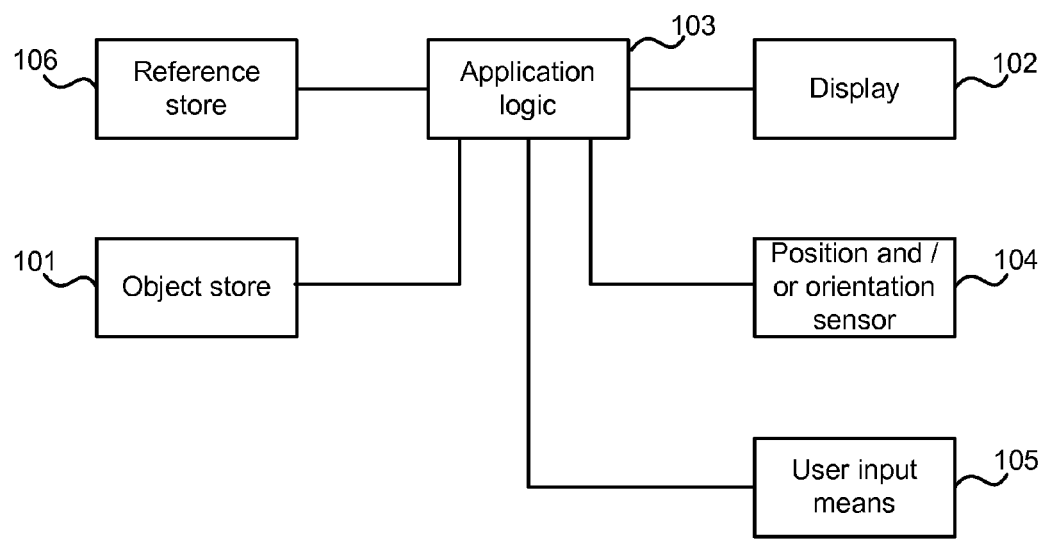
FIG. 1 shows a schematic diagram of a system for the manipulation of graphical objects.

FIG. 1 shows a schematic diagram of a system for the manipulation of graphical objects. Examples of graphical objects include, but are not limited to, one or more still images, moving images (e.g. movie clips), files/documents (e.g. Microsoft PowerPoint (trade mark) file), graphical elements within a file/document (e.g. clipart, WordArt etc), drawings, drawn objects (e.g. squares, rectangles etc within a drawing or design tool), renderings of three dimensional models, scanned images (e.g. scanned documents), web pages or any graphical file type (e.g. .gif, .jpg, .tif). A graphical object may comprise a single object or a group of objects (e.g. a collection of images). Whilst the description below refers to images, this is by way of example only. The system comprises a store 101 of graphical objects (such as images) and a display 102 for displaying these objects. The system further comprises application logic 103, a position and/or orientation sensor 104, a user input means 105 (such as a button) and a reference store 106. These elements may be combined in any way (e.g. the object store 101 and the reference store 106 may be combined) and may be co-located or distributed. Further examples are described below, in particular with reference to FIGS. 9 and 10.

Each graphical object has an associated base orientation which defines the orientation with which it is displayed with respect to a pre-defined reference direction, which may, for example, be vertical or horizontal. The pre-defined reference direction is detected using sensor 104. The reference direction may be pre-defined according to the type of display or the software application used to view the graphical object. In another example, the reference direction may be user-defined. The base orientation is stored in the reference store 106, which comprises a persistent data store. All graphical objects may initially (e.g. on creation) have a base orientation which is aligned with the reference direction (e.g. an initial base orientation of 0°).

Figure 2:
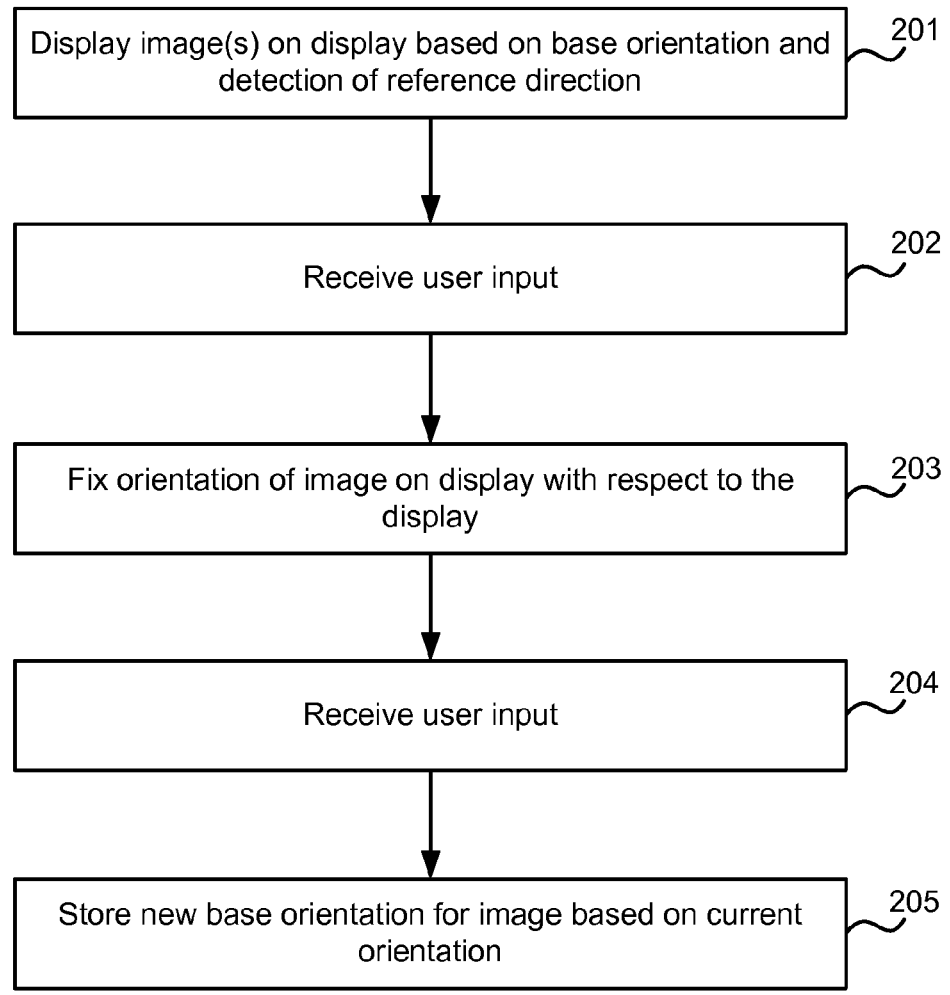
FIG. 2 shows a flow diagram of an example method of manipulating graphical objects.
Figure 3:
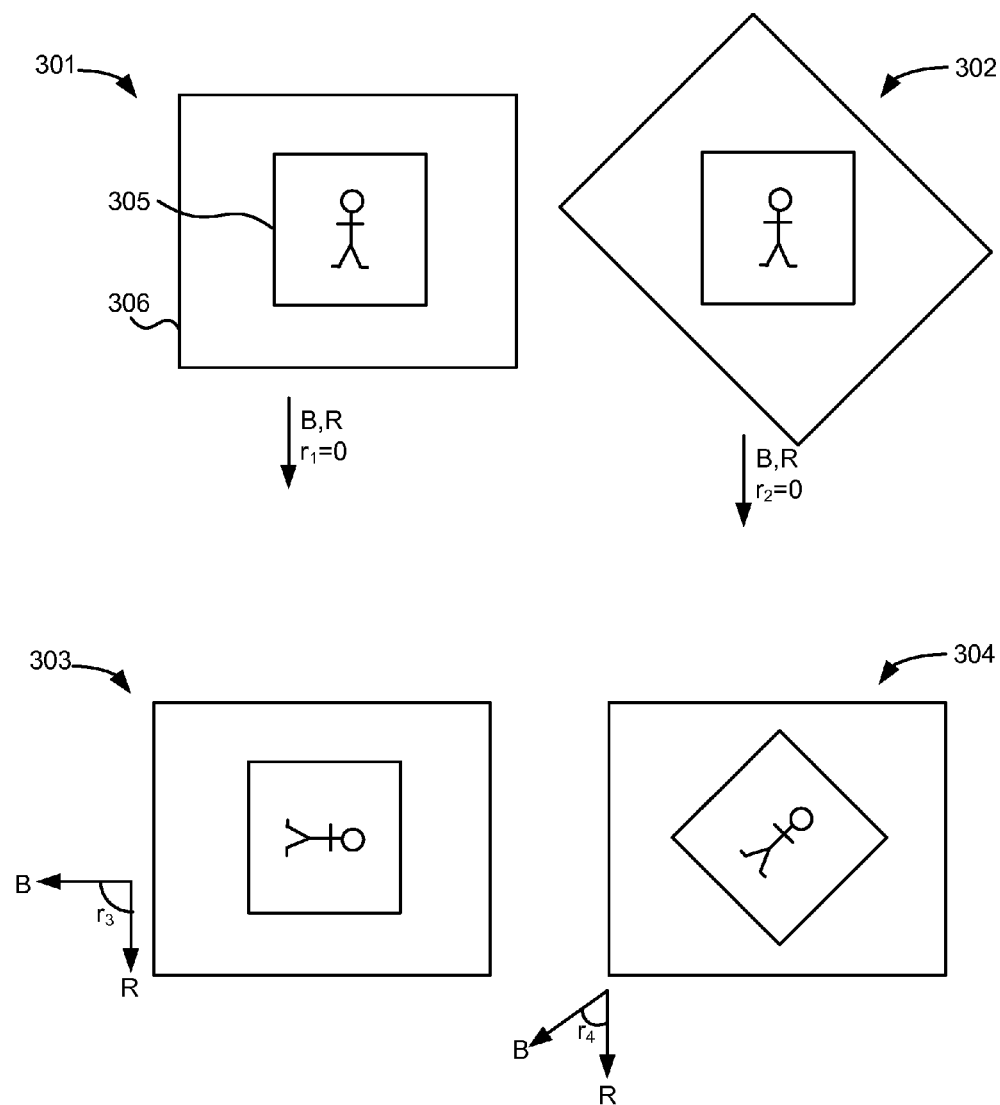
FIG. 3 shows four diagrams of an image displayed on a display.

FIG. 2 shows one of several techniques for manipulating graphical objects that can be practiced with the system of FIG. 1, and in particular the application logic 103. Whilst the examples described below with reference to FIGS. 1-11 and 14 refer to a user manipulating the orientation of a graphical object by rotating a device, this is by way of example only. Any motion of the device (e.g. rotation about any axis or translation in any direction) may be used to control the position and/or orientation of the graphical object and result in a stored persistent change in the manner in which the graphical object is displayed and FIGS. 12 and 13 relate to such examples. Furthermore the method may be used to manipulate more than one graphical object, as described below with reference to FIGS. 6-8.

An image (or other graphical object) is displayed on the display 102 according to a base orientation associated with the image and the reference direction (block 201). The base orientation associated with the image, which may be defined with respect to the reference direction, is read from the reference store 106 and the direction of the reference direction is determined using the orientation sensor 104. This can be understood with reference to FIG. 3 which shows four diagrams 301-304 of an image 305 displayed on a display 306, which may, for example, be housed in a tablet or ultra-mobile PC, a mobile device, a handheld device, etc. In each case, the reference direction R and the base orientation B of the image 305 are marked and in all examples the reference direction R is in the same direction (down the page). In the first two examples 301, 302, the base orientation B and reference direction R are aligned and in the other two examples 303, 304 the base orientation B is at an angle to the reference direction R. The base orientation may be defined in terms of this angle, $r_j$, between the base orientation B and the reference direction R, such that for the examples shown in FIG. 3:

$r_1 = 0°$
$r_2 = 0°$
$r_3 = 90°$
$r_4 = 45°$

The values of $r_j$ are stored in the reference store 106. By comparing the first two examples 301, 302, it can be seen that as the image 305 is displayed with reference to the reference direction R, it is displayed in the same orientation with respect to that direction, irrespective of the orientation of the device. For example, where the display 102 is the display on a mobile device, such as a PDA or mobile telephone, the image may always be displayed upright (with respect to gravity, which gives the reference direction) irrespective of the orientation at which the device is held (e.g. as if it were weighted at the bottom). In a further example where the pre-defined reference direction is magnetic north, the object is displayed in the same orientation with respect to magnetic north, irrespective of the orientation of the display 102.

Figure 4:
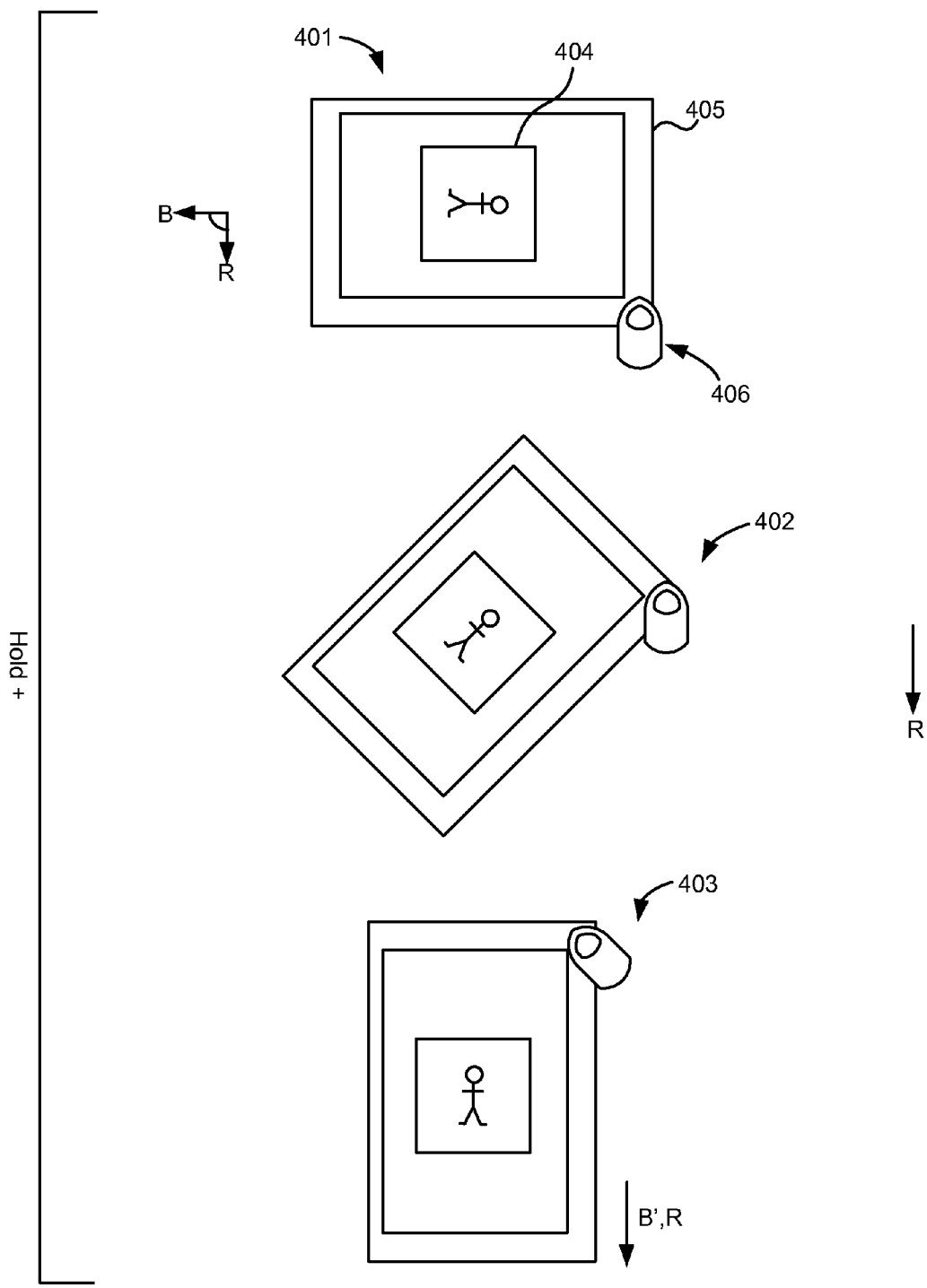
FIGS. 4 and 5 show successive example views of an image on a display during a manipulation operation according to FIG. 2.

Returning to FIG. 2, upon receipt of a user input (block 202), e.g. via user input means 105, the orientation of the image on the display 102 is fixed (or locked) with respect to the display (block 203). As the display 102 is subsequently moved, the image orientation on the display is unchanged, so as to maintain this locked orientation with respect to the display 102. This is shown in FIG. 4, which shows three successive views 401-403 of an image 404 on a display 405. The display 405 has a button beside it, which is pushed by a user 406 and it is this user input (received in block 202) which triggers the fixing of the orientation of the image with respect to the display device (block 203) rather than with respect to the reference direction (as in block 201). As the display is rotated (from the position in the first view 401 to the positions of the second and third views 402, 403) with the button pressed, the orientation of the image with respect to the display 405 does not change. However, the orientation with respect to the reference direction, R, does change. Upon receipt of a further user input (block 204), e.g. via user input means 105, a new base orientation B' is stored associated with the image (block 205) where this new base orientation B' is dependent upon the current orientation of the image (i.e. the orientation of the image with respect to the reference direction at the time the further user input is received). The current orientation may be determined on receipt of the user input using sensor 104 (in block 204) or alternatively it may be calculated based on motion detected using sensor 104 between the receipt of the two user inputs (between blocks 202 and 204).

Where the initial user input (received in block 202) comprised the user pressing and holding a button or other control, the further user input (received in block 204) may comprise the user releasing the button or control. In other embodiments, the two user inputs (received in blocks 202 and 204) may be independent, e.g. clicking a first control or pushing a button, followed by clicking/pushing the same control/button or a different control/button. In other examples, different user inputs may be used to control the operation, such as voice commands.

Figure 5:
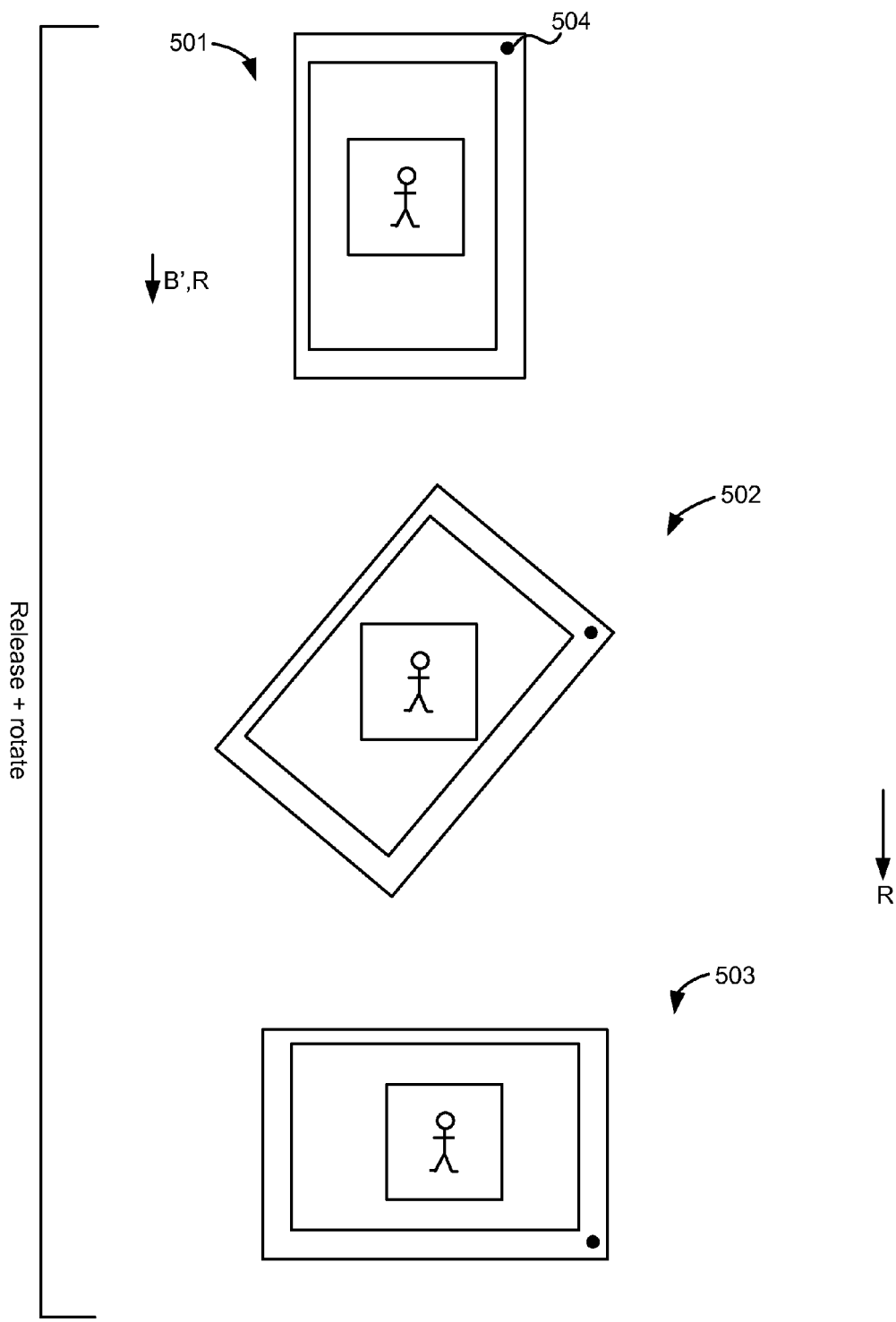

FIG. 5 shows three successive views 501-503 of an image on a display which follow on from those shown in FIG. 4. The first view 501 shows the image in the same orientation as in the last view 403 of FIG. 4; however the button 504 has been released. This release of the button 504 provides the further user input (of block 204) and triggers the storing of the new base orientation of the image (in block 205) in the persistent data store 106. The change between the original base orientation B and the new base orientation B' can be seen by comparing views 401 and 501. Using the notation described above with reference to FIG. 3, $r_{initial} = 90°$ and $r_{new} = 0°$. As the display is subsequently rotated (in a corresponding manner to that shown in FIG. 4), the image is not fixed with respect to the display (as it was in FIG. 4) but is fixed with respect to the reference direction, R. Because the new base orientation B' has been stored (in block 205) in a persistent data store 106, if the image is viewed again at a later date, the new base orientation B' will be used in displaying the image (e.g. in block 201).

The system of FIG. 1 may be considered allow a user to manipulate (or edit) a graphical object by switching between two modes of display and by moving (e.g. rotating) the device which comprises the display 102. In a first mode, the manner in which the graphical object is displayed (e.g. orientation and/or position of the image on the display 102) is defined by the object's base orientation B and is fixed relative to the pre-defined reference direction R detected by the sensor 104 (as in block 201 and as also shown in views 501-503 of FIG. 5). In a second mode, the manner in which the graphical object is displayed on the display 102 is fixed relative to the display itself (e.g. the position and orientation of the object on the display 102 is not fixed with respect to the reference direction but is instead fixed relative to the display 102, such that, as viewed by the user, the object rotates with rotation of the display 102). This second mode is shown in views 401-403 of FIG. 5 and described above (block 203). The system switches between the two modes upon user input (blocks 202 and 204). When switching from the second mode to the first mode (e.g. in response to the user input of block 204) a new base orientation B' of the object (with respect to the reference direction) is stored in the persistent reference store 106 such that it can be used for subsequent display of the object (block 205). The new base orientation is determined based on the detected orientation at the time of switching with respect to the reference direction. Alternatively the new base orientation may be determined from the initial detected orientation with respect to the reference direction in combination with motion detected during the second mode (which is detected using sensor 104).

As shown in FIGS. 4 and 5, the method described above can be used to manipulate (or edit) the orientation of an image, and one example application for such a method is to enable a user to correct the orientation of the image, such as a portrait image which is incorrectly displayed in landscape format. Such incorrect orientation of images is common in the display of digital photographs, where the photographer rotates the camera to take a photograph in portrait format but the images are all displayed in landscape format. Initially in view 401 the image 404 is not displayed in the correct orientation but is shown at 90° to the correct orientation. This initial orientation is determined by the base orientation B associated with this image 404 which is read from the reference store 106. Through the manipulation method described above and shown in FIG. 2, the new base orientation B' (stored in a persistent store in block 205) corresponds to the image 404 in the correct orientation (as shown in views 403 and 501). Subsequently the corrected orientation of the image is maintained (as shown by views 502 and 503) and the corrected orientation will be used for future viewing of this image.

As described above, the base orientation of an image may be defined in terms of an angle, r, from the reference direction. Where the initial base orientation is given by $r_{initial}$ and the rotation of the display between the receipt of the first and second user inputs is given by θ, the new base orientation $r_{new}$ is given by:

$$r_{new} = r_{initial} + \theta$$

In the example shown in FIGS. 4 and 5, $r_{initial}$=90° (rotation in a clockwise direction away from the reference direction) and θ=−90° (rotation in an anti-clockwise direction towards the reference direction). This gives $r_{new}$=0° as detailed above.

The above examples and methods relate to the display of one graphical object at a time on the display, where the graphical object may comprise multiple elements (e.g. several images). However, the methods are equally applicable where more than one graphical object is displayed at the same time (again where each graphical object may comprise one or more elements). In one embodiment, all the graphical objects which are displayed may be rotated and manipulated together, using the methods described above. However, in another embodiment, only one of (or any subset of) the objects may be manipulated and the rest remain unchanged. This is described in more detail below.

Figure 6:
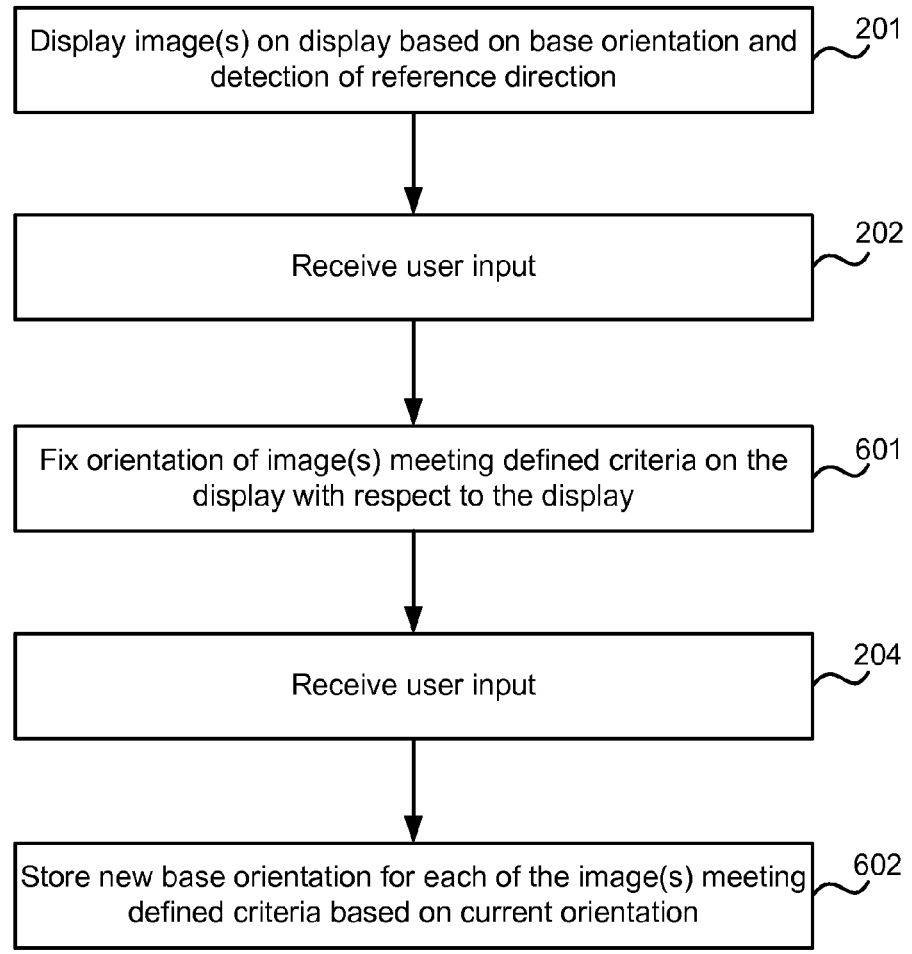
FIG. 6 shows a flow diagram of a second example method of manipulating graphical objects.

FIG. 6 shows a flow diagram of a second example method of manipulating graphical objects and this can be described with reference to FIGS. 7 and 8 which each show three successive views 701-703, 801-803 of multiple images 704, 705 on a display 706. Again, by way of example only, rotation is used to manipulate the orientation of the graphical object and the display parameter is the base orientation. As in FIGS. 4 and 5, the display 706 has an associated button 504 which a user 406 can press to provide user input signals. As described above, images are displayed on the display 706 based on each image's base orientation and the reference direction (block 201). Where multiple images are displayed, each image may have a different base orientation, however in this example only one reference direction is defined, as indicated by the arrow R. In the example shown in FIG. 7, the central image 704 has a base orientation which is different to the other images 705, or the base orientation (as defined by $r_j$) may be the same but the orientation of the image is different. On receipt of a user input (in block 202), the orientation of one or more of the displayed images 704 is fixed with respect to the display (block 601).

These one or more of the displayed images which have their orientation fixed in block 201 may be selected based on defined criteria, such as, size or position on the display 706. Alternatively, these one or more images may be identified by the user (e.g. through tapping on the images where the display is touch sensitive or by highlighting or clicking on images using a cursor). Where a size criterion is defined, this may, for example, result in the selection of the largest image, the largest N images (where N is an integer) or all images which meet particular size requirements. Where a criteria relating to position on the display is used, this may, for example, result in selection of the image(s) closest to the centre of the display 706. The image(s) selected based on the defined criteria or identified by a user are referred to herein as 'fixed images', whilst the remaining images are referred to as 'non-fixed images'.

Once the orientation for the fixed images (image 704 in the example shown) has been fixed with respect to the display 706 (in block 601), when the display 706 is rotated (as shown by views 702 and 703) the fixed image 704 maintains its orientation on the display, whilst the orientation of the non-fixed images 705 on the display is changed such that they continue to be displayed in a fixed orientation with respect to the reference direction, R. For example, where the reference direction is vertically downwards (as determined by the direction of acceleration due to gravity), the non-fixed images 705 are displayed such that they always appear upright as the display 706 is rotated, whilst the fixed image(s) 704 maintain their position on the display 706 and therefore appear to rotate with the display 706 as it is rotated. On receipt of a further user input (block 204), e.g. when button 504 is released by user 406, a new base orientation is stored for the fixed image 704 (block 602) based on the current orientation of the display. The base orientations for the non-fixed images (e.g. images 705) are unaffected. The new base orientation for the fixed image(s) 704 is stored in a persistent data store (e.g. reference store 106) such that it can be used for any subsequent display of the image(s), unless the base orientation is further updated (e.g. by repeating the method described above and shown in FIG. 2 or FIG. 6).

If following the further user input (e.g. following the release of button 504) or subsequently, the display 706 is rotated without first receiving a user input (as shown in the three views 801-803 of FIG. 8), all the images are shown in an orientation which is fixed with respect to the reference direction, R, based on their base orientation, $r_j$.

Figure 9:
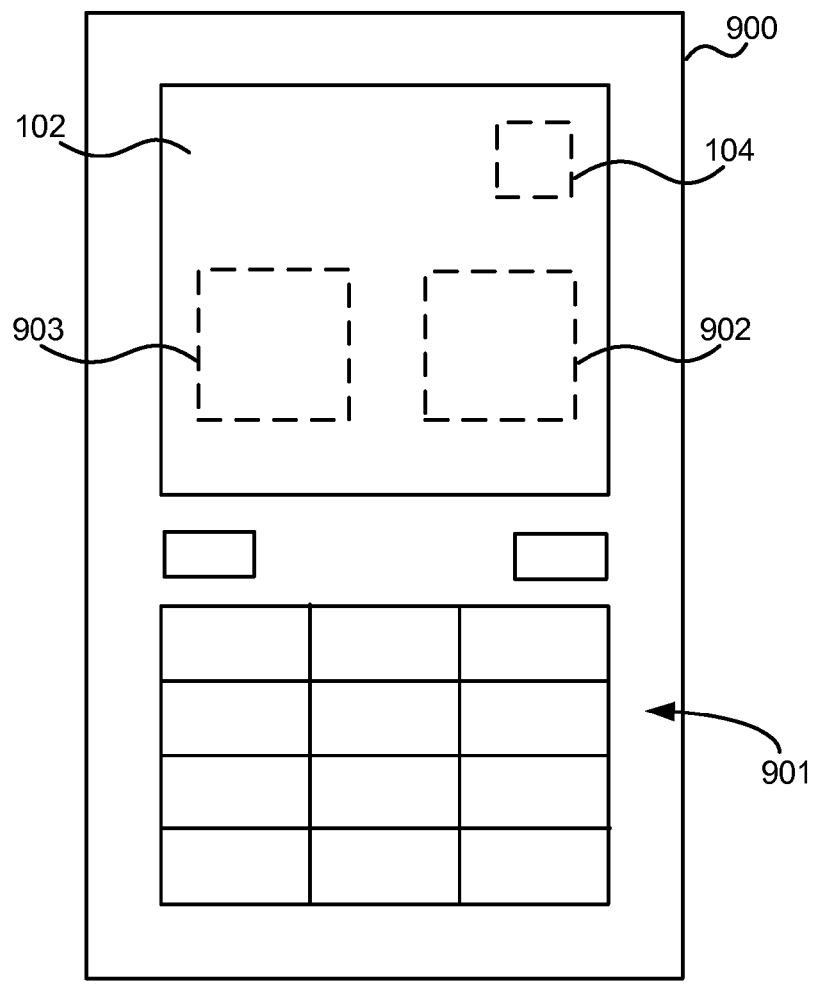
FIG. 9 shows a schematic diagram of a handheld device.

The system of FIG. 1 can be implemented using a mobile or portable device which includes at least the display 102, the orientation sensor 104 and the user input means 105, such as a mobile telephone, laptop, tablet or ultra-mobile PC, digital picture frame, digital camera or PDA. The application logic 103 may be implemented within the device (e.g. on a processor within the device) or within another device (e.g. a server) which can communicate with the mobile/portable device. The stores 101, 106 may be implemented in the memory of the device and the user input means 105 may comprise a button (e.g. a hardware button), a touch sensitive screen (e.g. with a software button or other GUI element) or other user input device, such as a mouse or keyboard (e.g. in combination with a software button or other GUI element). In further examples, the user input means may comprise a microphone in combination with voice detection software, such that a user can control the method through voice commands. In an embodiment a mobile/portable device may comprise all the elements of FIG. 1, as shown in FIG. 9. FIG. 9 shows a schematic diagram of a handheld device 900 which comprises a display 102 and a number of buttons 901 which provide user input means 105. An orientation sensor is 104 included within the device (shown by dotted line), along with a processor 902, which implements the application logic 103, and persistent memory 903, which provides the object and reference stores 101, 106.

Figure 10:
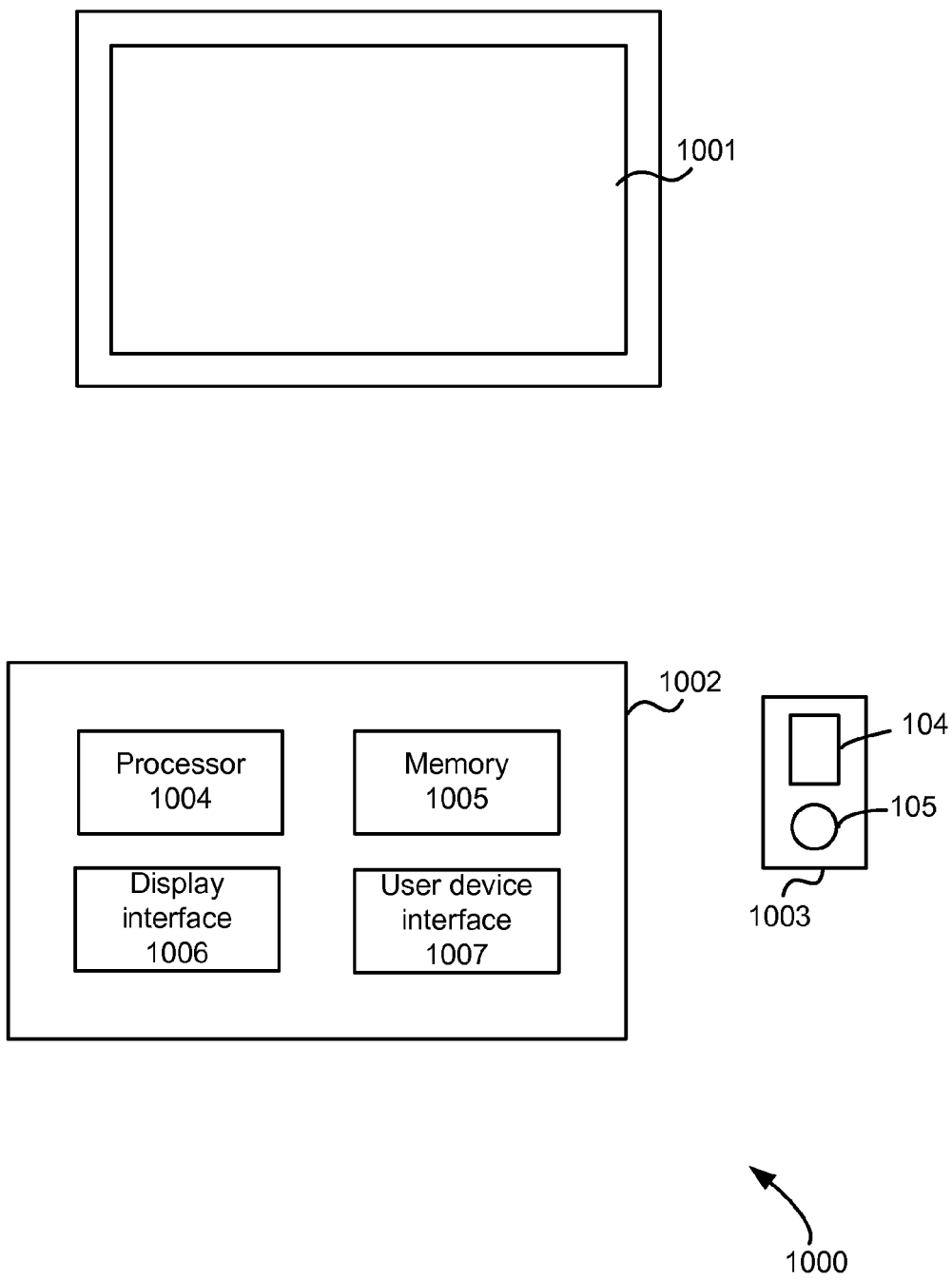
FIG. 10 shows a schematic diagram of an example system which comprises a fixed or non-portable display.

The system of FIG. 1 may also be implemented using a fixed or non-portable device, which comprises at least the display 102, such as a PC or television. FIG. 10 shows a schematic diagram of such an example system 1000 which comprises a large display 1001, such as a television, a processing unit 1002, such as a PC, and a portable device 1003, such as a presenter device, remote control device, mobile telephone, PDA or custom device. This portable device 1003 may also be referred to as a proxy device. Whilst, in use, the display 1001 and the portable device 1003 are geographically co-located, such that the user holding the portable device 1003 can see the graphical objects shown on the display 1001, the processing unit 1002 may be geographically co-located or may be remote. In an example, the display 1001 and the processing unit 1002 may be integrated. The portable device 1003 comprises the orientation sensor 104 and the user input means 105 (e.g. a hardware or software button or other means, as described above), whilst the processing unit 1002 comprises a processor 1004, which implements the application logic 103, and persistent memory 1005 which comprises the object store 106 and the reference store 101. The processing unit 1002 also comprises an interface to the display 1006 and an interface 1007 to enable it to communicate with the portable device 1003. The three elements 1001-1003 may communicate wirelessly or alternatively two or more of the elements may be connected by wired connections. For example, the communication between the display 1001 and the processing unit 1002 may be via a USB or serial lead whilst infrared or Bluetooth may be used between the processing unit 1002 and the portable device 1003.

In a further variation of the system of FIG. 10, the orientation sensor 104 may not be located in the proxy device 1003 but may be capable of detecting motion/orientation/position of the proxy device. For example, the orientation sensor may be located within the processing unit 1002 or the display 1001. In another example, the orientation sensor may comprise a camera mounted on the display 1001 and arranged to detect the motion/orientation/position of the proxy device (e.g. through image analysis). In another example, the orientation sensor may be located within a mat or other planar surface which can detect the relative position/orientation of the proxy device and can detect motion as a change in that relative position/orientation. In yet a further variation, the user input means 105 may not be located within the proxy device 1003, but may be located within the processing unit 1002 or the display 1001. For example, where the user input means 105 comprises a GUI element in combination with a mouse/keyboard/touch sensitive display, or where the user input means comprises a microphone in combination with voice detection software.

Figure 11:
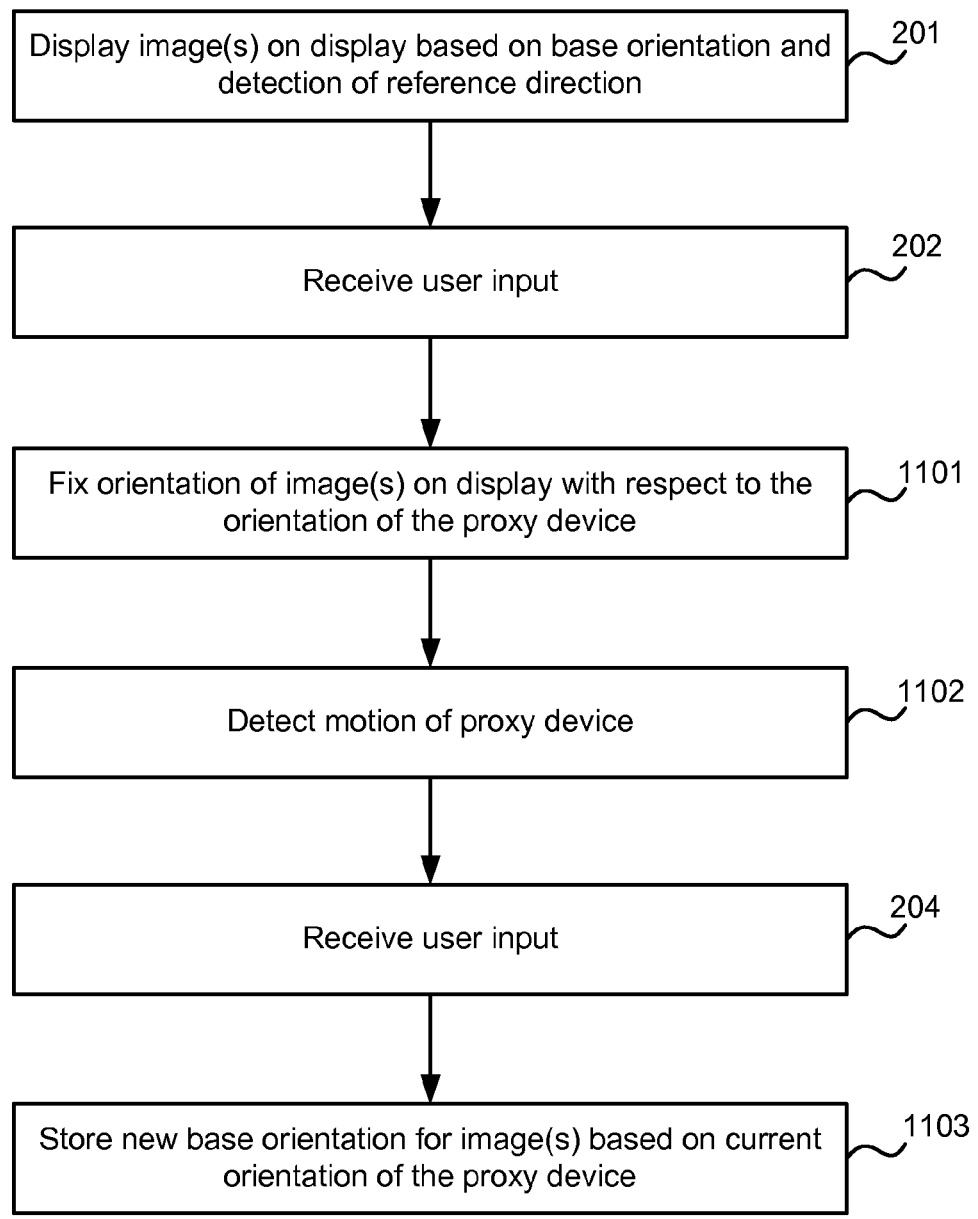
FIGS. 11 and 12 show flow diagrams of further example methods of manipulating graphical objects.

FIG. 11 shows one of several techniques for manipulating graphical objects that can be practiced with the system of FIG. 10. Initially, the images are displayed based on the base orientation associated with each image and the detected reference direction (block 201), as described above. On receipt of a first user input (block 201), the position and/or orientation of the image (or images) is fixed with respect to the position and/or orientation of the portable (or proxy) device 1003 (block 1101), rather than with respect to the display 1001, which remains in a fixed position and/or orientation. The motion of the proxy device 1003 is detected (in block 1102) following receipt of the first user input (in block 202) and based on the detected motion of the proxy device 1003 the orientation of the image on the display is changed so as to maintain the fixed relationship with the orientation of the proxy device 1003. Following receipt of the second user input (in block 204), a new display parameter (e.g. a new base orientation) for the image is stored (block 1103) based on the current position and/or orientation of the proxy device 1003 with respect to the reference direction.

In a further example, the system of FIG. 1 may be implemented using a fixed or non-portable device but with a rotatable display device, such as an LCD display on a rotating mount, with the orientation sensor 104 being located within or on the display 102. In such an example, the system may operate as shown in FIGS. 2 and 6.

The processors 902, 1004 may be microprocessors, controllers or any other suitable type of processors for processing computing executable instructions to control the operation of the device in order to perform aspects of the methods described herein. The persistent memory 903, 1005 may be of any suitable type such as a disk storage device of any type such as a magnetic or optical storage device, a hard disk drive, or a CD, DVD or other disc drive. Flash memory, EPROM or EEPROM may also be used. Platform software comprising an operating system or any other suitable platform software may be provided at the computing-based device to enable application software to be executed on the device. The platform software and application software may be stored in the memory.

The position and/or orientation sensor 104 may be any device capable of determining position and/or orientation of the display or proxy device and the selection of sensor may depend on the particular reference direction used and, in some examples, on a type of motion to be detected (in blocks 1102 and 1203). For example, if the reference direction is vertically downwards, the sensor 104 may be required to detect acceleration due to gravity. However, if the reference direction is in the horizontal plane (e.g. magnetic north), the sensor 104 may be required to detect a compass direction. Examples of sensors include, but are not limited to, an accelerometer (e.g. a tri-axis accelerometer), a tilt sensor, a digital compass, a GPS receiver, a gyroscope, a mercury switch and a magnetometer. In a further example, the sensor 104 may comprise an image capture device which operates in conjunction with an analysis engine to detect optical flow (e.g. the motion of objects between captured frames) and from this detects position and/or orientation or a change in position and/or orientation. The current position and/or orientation of a device (which is used in determining the new base orientation or other display parameter) may be determined from a detected change in position and/or orientation. Whilst the examples described above show only one sensor, it will be appreciated that multiple sensors may be used, e.g. an orientation sensor and a position sensor or multiple orientation sensors.

In order to eliminate jitter or other measurement artifact caused by muscle tremor, the output of the sensor 104 may be filtered, e.g. using a low-pass filter. In an example, a tri-axis accelerometer may be used to obtain acceleration values [$a_x$, $a_y$, $a_z$]. These may be filtered (e.g. using a low-pass filter will a roll-off <5 Hz) to produce [$f_x$, $f_y$, $f_z$] and used to determine the orientation with respect to gravity, θ(t):

$$\theta(t) = \tan^{-1}\left(\frac{f_y}{f_z}\right)$$

Figure 7:
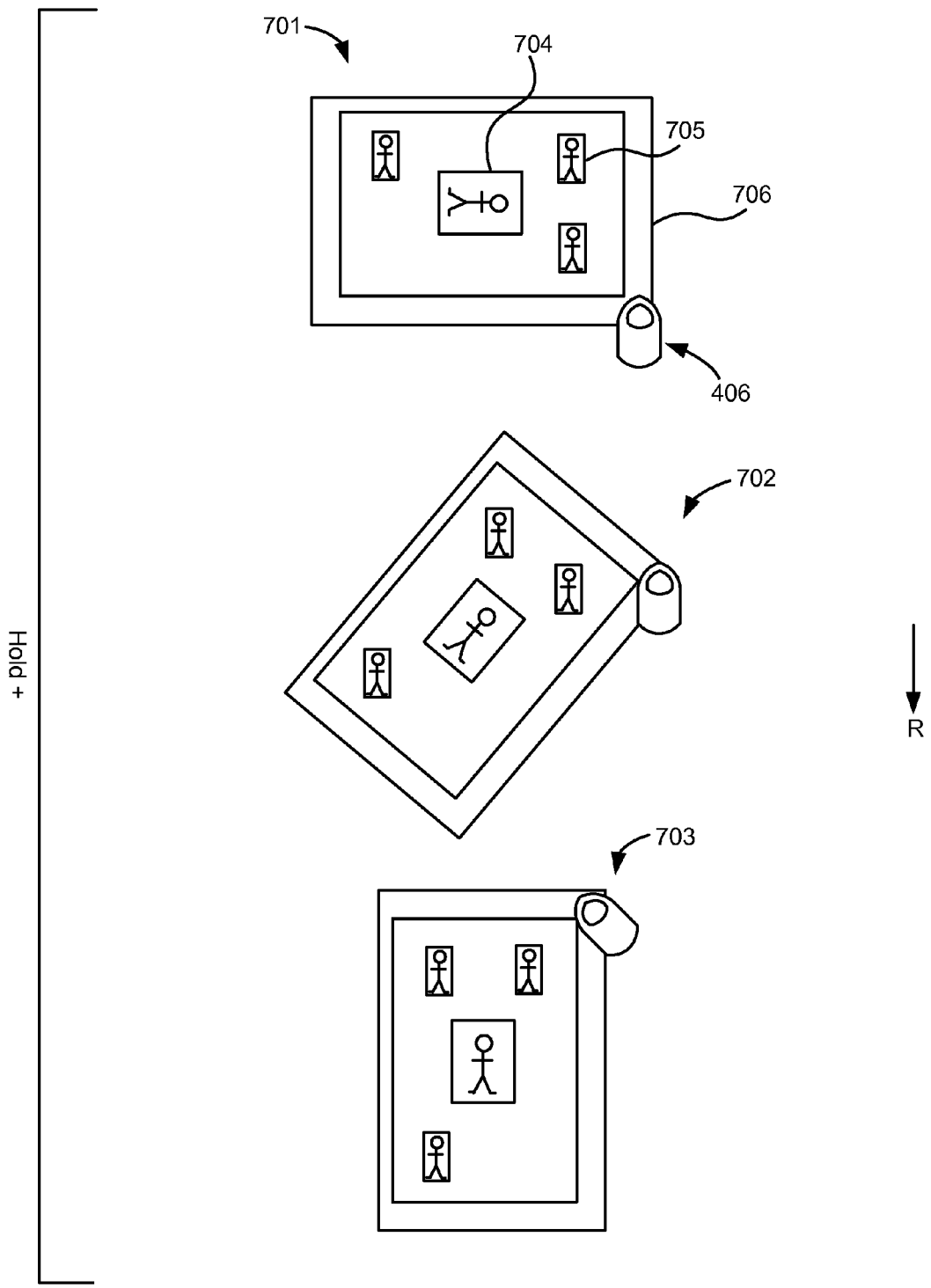
FIGS. 7 and 8 show successive example views of multiple images on a display during a manipulation operation according to FIG. 6.
Figure 8:
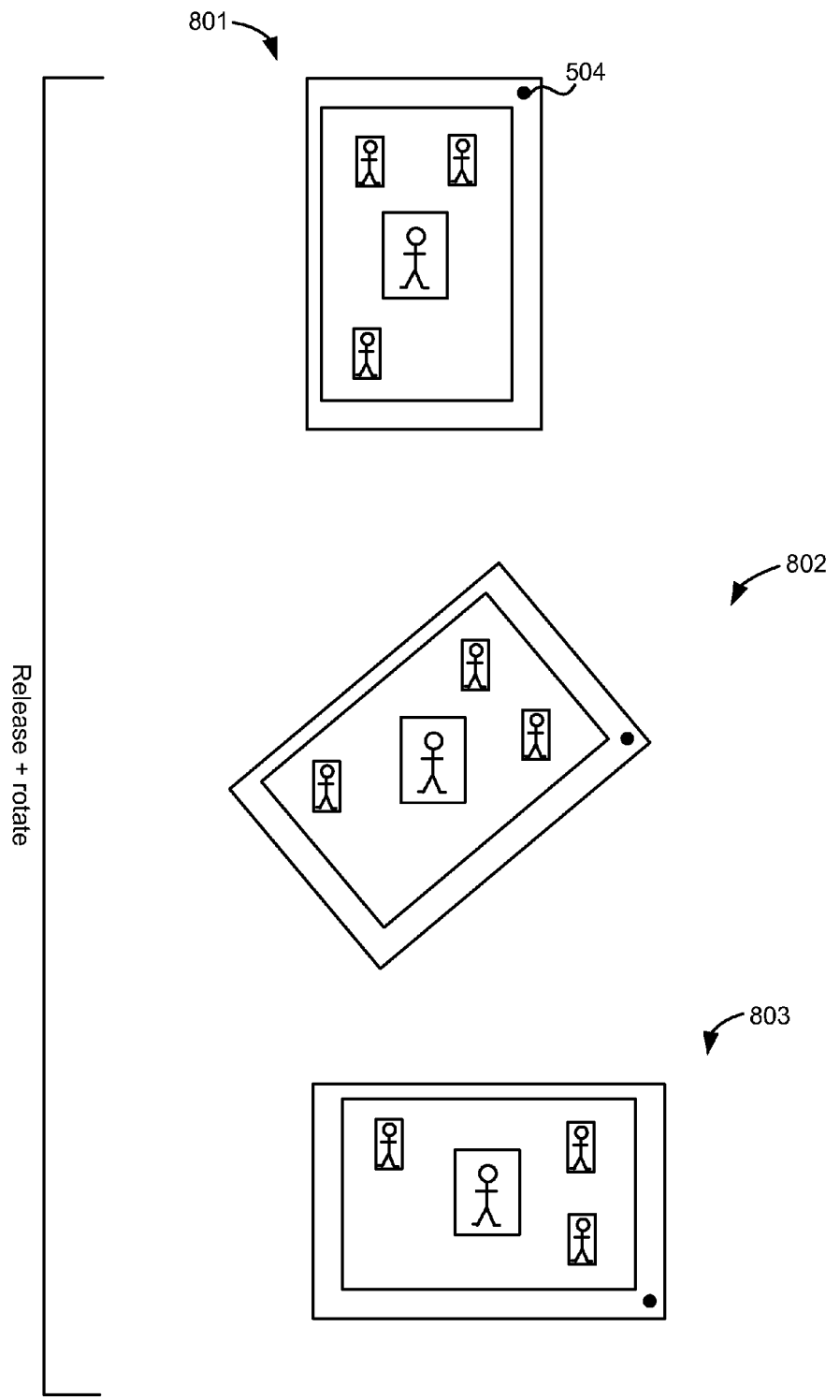

In the examples above which describe the manipulation of a graphical object where multiple graphical objects are displayed at the same time (e.g. as shown in FIGS. 7 and 8), only a single reference direction, R, is used. However, in a multi-user environment there may be multiple reference directions, $R_i$. Each user may have their own defined reference direction and may manipulate only their subset of images with respect to this reference direction. This may be particularly applicable to situations where there is a large display and the manipulation occurs using a proxy device (e.g. as shown in FIG. 10). In such an example, there may be a single proxy device 1003 shared between the multiple users or there may be multiple proxy devices 1003 associated with the display 1001 and the processing unit 1002, with each user having an assigned proxy device. Further variations may also be implemented, for example, with subsets of graphical objects associated with each of the proxy devices.

Although the above examples show the methods described herein being used to manipulate the angle of display of an image through rotation with the sensor 104 being at least an orientation sensor, the methods may also be applied to other aspects of graphical object manipulation, such as zoom and/or pan operations, where the change is stored in a persistent manner for future display of the graphical object. Furthermore, although the examples above show rotation about a single axis, such that the rotation is within the plane of the display, any rotation may be about any axis and in any direction. The motion of the device, resulting in a change in position/orientation of the device, may be arranged to result in any change in the orientation/position of the displayed graphical object. Additionally, manipulation operations may be combined such that, for example, rotation from portrait to landscape also results in an enlargement of the graphical object (i.e. a combination of rotation and zoom functions).

Figure 12:
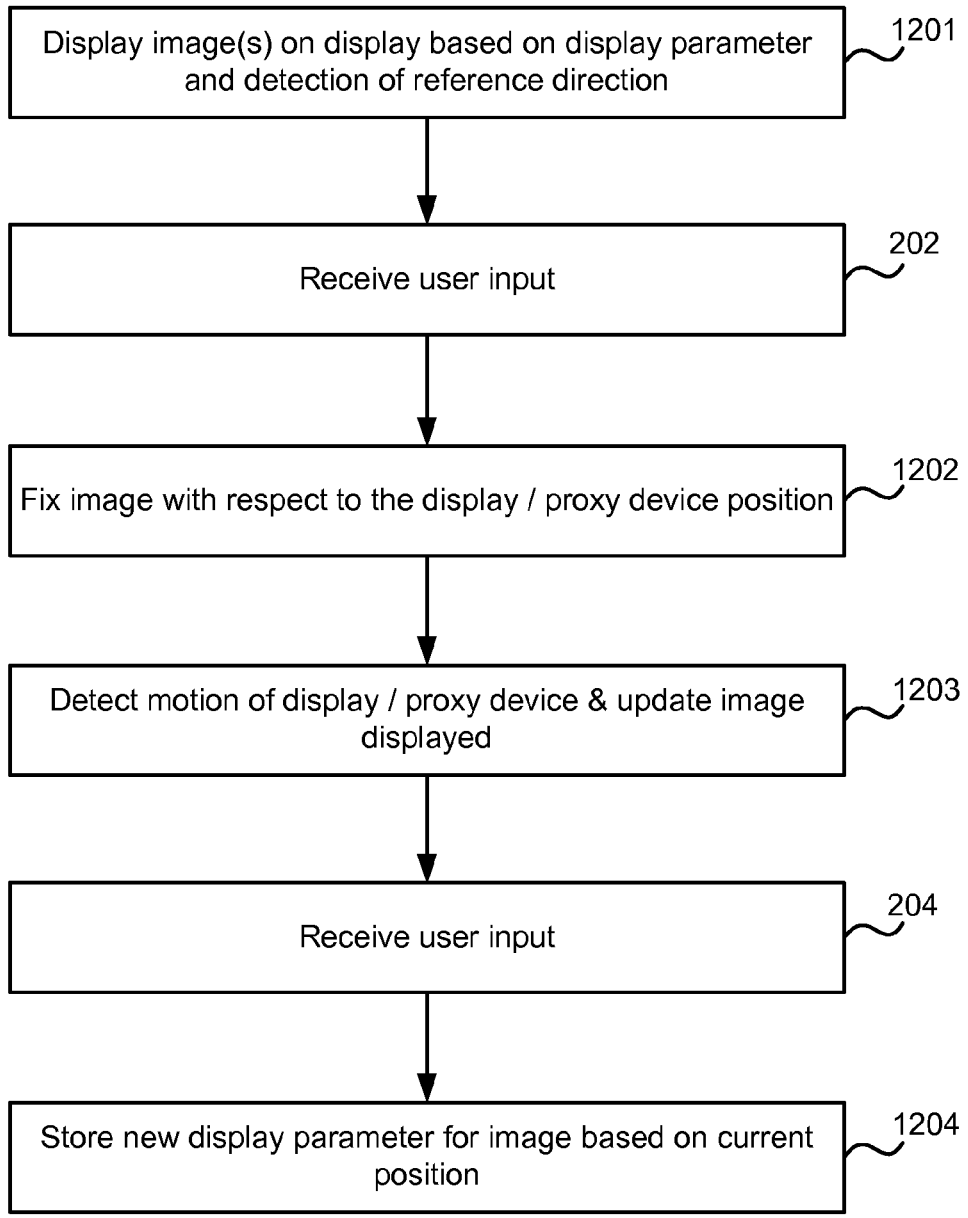

FIG. 12 shows a flow diagram of a further example method of manipulating graphical objects, which is a modified version of FIG. 2 and it will be appreciated that FIG. 6 may be modified in a corresponding manner. As in the methods described above, the image is displayed on the display based on the display parameter, which may comprise a base orientation, a base position and/or other parameters (block 1201). For pan/zoom operations, the image displayed (or the fixed images) may be fixed in space with respect to the position of the display/proxy device (in block 1202) in response to the first user input (in block 202). When the display/proxy device is subsequently moved, this motion is detected (block 1203) and the portion of the image displayed on the display may be modified accordingly. Upon receipt of the second user input (in block 204), a new display parameter for the image(s) is stored in persistent memory based on the current position of the display/proxy device (block 1204). This new stored display parameter (which may comprise a new base orientation) is used for subsequent display of the image. Other examples of display parameters include, but are not limited to, a position parameter, a zoom factor and coordinates for a portion of the graphical image.

Figure 13:
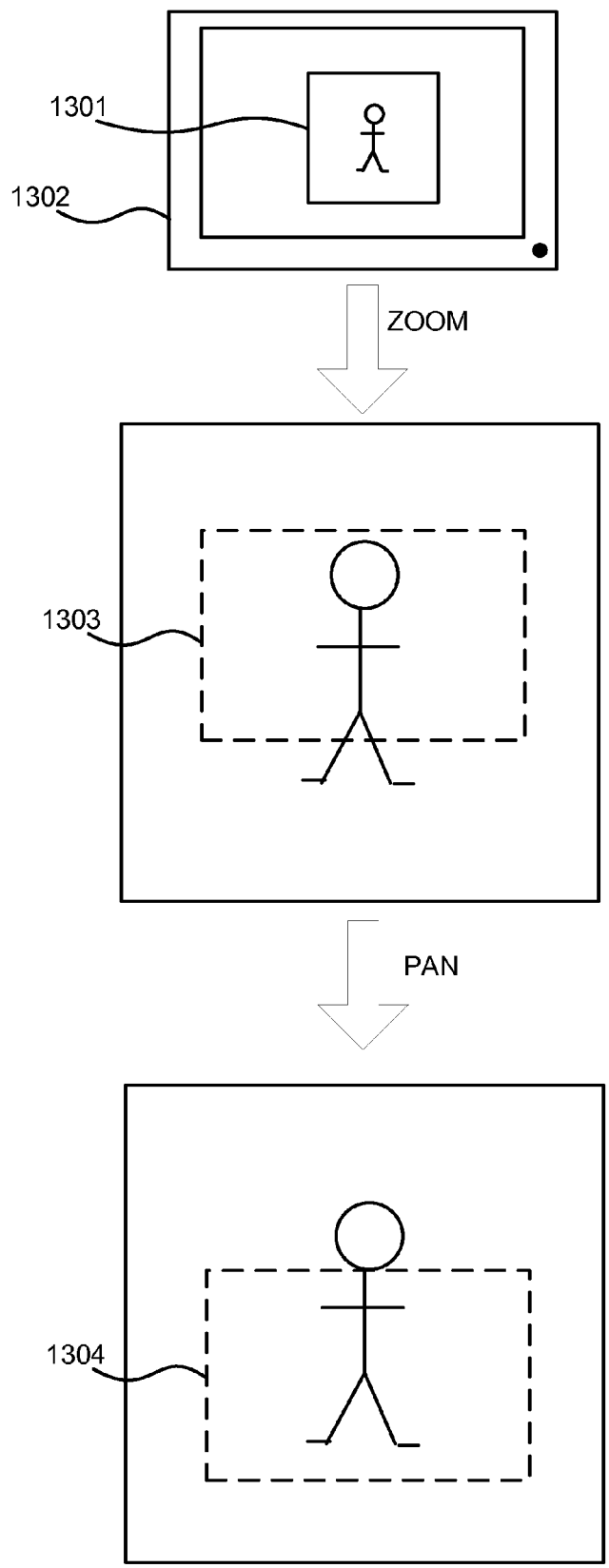
FIG. 13 shows successive example views of an image on a display during a manipulation operation according to FIG. 12.
Figure 14:
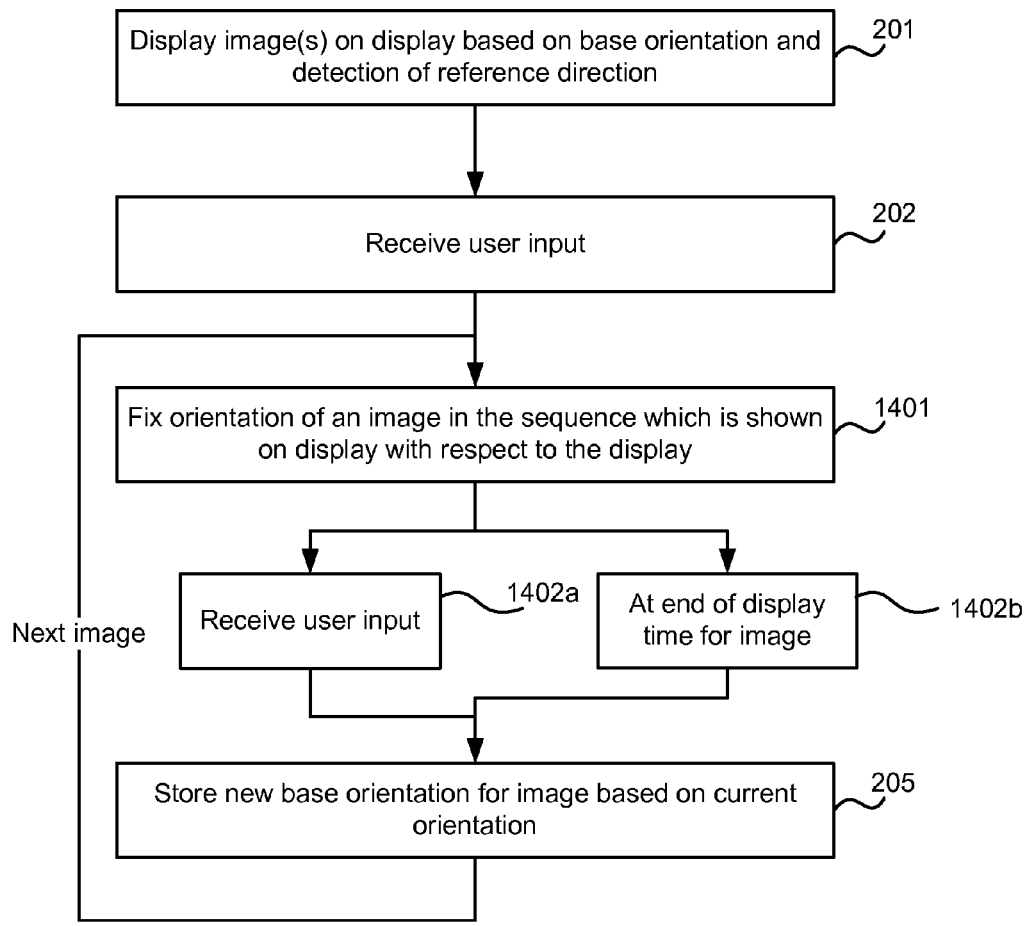
FIG. 14 shows a flow diagram of another example method of manipulating graphical objects.

FIG. 13 shows views of an image manipulated in this manner. Initially the entire image 1301 may be shown on the display 1302 (block 1201), however, as a result of a user input (in block 202), the image may be fixed with respect to the display position (block 1202). Subsequent detected motion (e.g. a vertical translation) may result in a zoom operation such that only a portion of the image (as indicated by dotted rectangle 1303) may be visible. A second user input (received in block 204) may result in the storing of a new display parameter (block 1204) such that on subsequent display of the image, only this portion 1303 is displayed. However, a further detected motion (e.g. a horizontal translation) may result in a pan operation such that a different portion 1304 is displayed. Again a second user input may result in the storage of a new display parameter such that on subsequent display of the image only this portion 1304 is displayed. Alternatively the zoom operation may be performed in any other manner.

In an embodiment, for pan manipulations, the display/proxy device may be moved in the plane of the display (e.g. in the horizontal plane), whilst for zoom operations, the display/proxy device may be moved in a perpendicular plane (e.g. in a vertical plane). In a further example of the mapping between change in orientation/position of the display/proxy device and manipulation of a graphical object, tilting of the display/proxy device may result in a pan operation. A zoom operation may be implemented through rotation of the display/proxy device in the plane of the display. As shown in FIG. 13, several manipulation operations may be combined (e.g. pan and zoom), for example with rotation in the plane of the display resulting in a zoom and rotation of the device not in this plane resulting in a pan operation. In other examples, the mapping between the detected motion (or change in orientation determined in any other way) and the resultant manipulation may be dependent upon the particular user input received. In an embodiment, a user may press a first button to effect rotation (e.g. using the method of FIG. 2) and a second button to effect pan (e.g. using the method of FIG. 12) etc. In such an example, the same motion (e.g. rotation in the plane of the display) may be mapped differently according to the user input received.

During the manipulation process (e.g. during the motion, as detected in blocks 1102 and 1203, or between blocks 202 and 204), the system may provide feedback to the user, such as tactile or audible feedback, e.g. through vibrations or sound. This may be provided at defined intervals during the motion of the device or when aspects of the image meet predefined criteria, based on analysis of the displayed image. In the example shown in FIG. 4, image analysis may determine when the person within the image is upright (e.g. in view 403) and feedback may be provided at this point. In another example, image analysis may be used to identify the horizon in an image and feedback provided when the horizon is level. This assists the user in correcting the orientation of images. Alternatively, the feedback may be provided at regular angular increments, such as 45°, (e.g. on reaching view 402 and again on reaching view 403).

In addition to, or instead of, providing feedback, the system may provide an 'auto-snap' function such that the object may be manipulated in specified increments (e.g. 5°) or where image analysis detects that as a result of the manipulation operation, an element of the object is close to horizontal/vertical, the image may be snapped to this orientation (e.g. with the horizon level).

Whilst the above examples relate to still graphical objects, the methods are also applicable to moving graphical objects, such as video clips. The moving graphical objects comprise a sequence of frames (each of which is a graphical object) and the methods described herein may be applied to the entire sequence, through manipulation of one of the frames (e.g. the first one) and applying the same revised base orientation to the entire sequence. Alternatively, the methods described may be applied individually to each frame in the sequence, to groups of frames within the sequence (e.g. pairs of frames) or may be applied dynamically to the sequence whilst the sequence is played back, as shown in the example flow diagram of FIG. 14. Where the manipulation is performed dynamically, the sequence may be viewed at normal speed or alternatively the sequence may be viewed at reduced speed. For such dynamic manipulation the second user input trigger (as in block 204) may be replaced by a separate user input trigger for each frame (block 1402a) or the storage of a new base orientation for a frame may be triggered as a result of the display changing to the next frame (block 1402b). The example flow diagram of FIG. 14 includes both triggering options. The manipulation process is repeated as the images are shown in sequence. Where the second user input is required (block 1402a), this may also provide the trigger to show the next image in the sequence or the system may automatically sequence through the images. Whilst FIG. 14 refers to fixing the orientation of the image with respect to the display (block 1401) in response to the user input (received in block 202), it will be appreciated that in a further embodiment, the orientation of the image may be fixed with respect to the orientation of a proxy device 1003.

Whilst in the above description, the base orientation for a graphical object is stored in a reference store in terms of an angle $r_j$, this is just one possible way in which this base orientation may be recorded. In a further example, the angle, $r_j$, may be stored within the metadata or other tag associated with the graphical object. In another example, the graphical object may be re-saved (in blocks 205, 602, 1103, 1204) with the new orientation. Additionally, the base orientation is one example of a display parameter, which may alternatively (or in addition) comprise position data (e.g. where pan/zoom operations have been performed as shown in FIG. 13) or any other parameter which may be used in determining the way a graphical object is displayed initially. For example, the image may have new position parameters stored following the pan and zoom operations such that on subsequent viewing of the image, portion 1304 is displayed. Alternatively, the image may be resaved following the zoom and pan operations such that the resaved version (which may or may not replace the original) comprises only the visible portion 1304.

A graphical object may have more than one associated base orientation (e.g. more than one value of $r_j$) or other display parameter, where different values are associated with different applications for the graphical object. For example, an image may be displayed with one base orientation when displayed in a word processing or presentation tool and may be displayed with a second base orientation in a digital picture frame. In such an example, the value of the particular display parameter (such as the base orientation) for a graphical object may be stored associated with details of the application to which it applies. Where the graphical image is re-stored, rather than storing an angle for the base orientation, multiple copies may be stored where the graphical object is used at different base orientations (or with other different display parameters) for different applications. Different base orientations (or display parameters) may in addition, or instead, be associated with different users.

The above methods for the manipulation of graphical objects may be used in many applications, including but not limited to:
  correction of image orientation
  horizon leveling
  orientation correction of scanned/faxed documents
  photograph/image manipulation, e.g. to create collages
  graphical design tools, to quickly rotate elements e.g. to build up a 3D model
  viewing a portion of a detailed graphical object on a small display Although the present examples are described and illustrated herein as being implemented in systems as shown in FIGS. 1, 9 and 10, the systems described are provided as examples and not as limitations. As those skilled in the art will appreciate, the present examples are suitable for application in a variety of different types of processing and display systems.

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants (PDAs) and many other devices.

The methods described herein may be performed by software in machine readable form on a storage medium. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A method comprising:
    displaying at least two objects on a display at a first orientation and at least one object at a second orientation that is different from the first orientation, with each orientation being set with respect to a reference direction, the first orientation of the at least two objects on the display being set to a fixed value with respect to the reference direction;
    detecting rotation of the display along an axis substantially perpendicular to the display; and
    in response to detecting the rotation of the display, rotating the at least one object from the second orientation to the first orientation or a third orientation while maintaining the at least two objects at the first orientation.

2. The method of claim 1, further comprising detecting a button being held down on the display during the rotation of the display and during the rotating of the at least one object.

3. The method of claim 1, wherein the button comprises a mechanical button or a rendered button on the display.

4. The method of claim 1, further comprising detecting a button being held down prior to detecting the rotation of the display and during the rotating of the at least one object.

5. The method of claim 1, wherein the third orientation comprises an angle corresponding to a detected change in orientation of the display with respect to the reference direction.

6. The method of claim 1, wherein the reference direction comprises one of: vertical, horizontal and magnetic north.

7. The method according to claim 1, wherein the at least one object, the at least two objects, or both, comprise a single image or a group of images.

8. A method according to claim 1, wherein of the at least one object, the at least two objects, or both, comprise a graphical object that is stored in memory.

9. A method comprising:
    displaying at least one object on a display at a first orientation and at least two objects at a second orientation that is different from the first orientation, with each orientation being set with respect to a reference direction, the first orientation of the at least one object on the display being set to a fixed value with respect to the reference direction;
    detecting rotation of the display along an axis substantially perpendicular to the display; and
    in response to detecting the rotation of the display, rotating the at least two objects from the second orientation to the first orientation or a third orientation while maintaining the at least one object at the first orientation.

10. The method of claim 9, further comprising detecting a button being held down on the display during the rotation of the display and during the rotating of the at least one object.

11. The method of claim 10, wherein the button comprises a mechanical button or a rendered button on the display.

12. The method of claim 9, further comprising detecting a button being held down prior to detecting the rotation of the display and during the rotating of the at least one object.

13. The method of claim 9, wherein the third orientation comprises an angle corresponding to a detected change in orientation of the display with respect to the reference direction.

14. The method according to claim 9, wherein the reference direction comprises one of: vertical, horizontal and magnetic north.

15. The method according to claim 9, wherein each of the at least one object, the at least two objects, or both, comprise an image that is stored in memory.

16. A system comprising:
    a display comprising at least two objects at a first orientation and at least one object at a second orientation that is different from the first orientation, with each orientation being set with respect to a reference direction, the first orientation of the at least two objects being set to a fixed value with respect to the reference direction;
    a sensor that detects when the display is rotated from or changes orientation from the reference direction; and
    a processor that rotates the at least one object from the second orientation to the first orientation or a third orientation when the sensor provides an indication that the display has been rotated from the reference direction while maintaining the at least two objects at the first orientation.

17. The system of claim 16, further comprising a button and wherein the processor receives an indication that the button is being held down then rotates the at least two objects in response to when the motion sensor provides the indication that the display is being rotated from the reference direction.

18. The system of claim 16, wherein the third orientation comprises an angle corresponding to a detected change in orientation of the display with respect to the reference direction.

19. The system of claim 16, further comprising a memory that stores the at least one object and the at least two objects being displayed on the display.

20. The system of claim 16, wherein the system comprises a mobile device or a handheld computer.

* * * * *